United States Patent [19]

Calvert

[11] Patent Number: 4,913,378

[45] Date of Patent: Apr. 3, 1990

[54] AIRPLANE WITH TRANSONIC/HYPERSONIC TO SHORT TAKE OFF AND LANDING (STOL) FLIGHT CAPABILITY

[76] Inventor: Galen E. Calvert, 5510 Lake White Ct., Fairfax, Va. 22032

[21] Appl. No.: 119,954

[22] Filed: Nov. 13, 1987

Related U.S. Application Data

[63] Continuation-in-part of Ser. No. 854,475, Apr. 22, 1986, abandoned.

[51] Int. Cl.4 .................................................. B64C 3/38
[52] U.S. Cl. ....................................... 244/46; 244/123; 244/118.1; 244/87
[58] Field of Search .............. 244/45 R, 46, 87, 118.1, 244/123

[56] References Cited

U.S. PATENT DOCUMENTS 3,155,344  11/1964  Vogt ........................................ 244/46
4,036,455   7/1977  Whitener ............................ 244/118.1

FOREIGN PATENT DOCUMENTS 1947500  4/1971  Fed. Rep. of Germany ........ 244/46
1334496  7/1963  France ................................. 244/46
 510430  1/1955  Italy .................................... 244/46

OTHER PUBLICATIONS

Coward, "A Study to Determine the Weight and Performance Character of Variable Geometry Spacecraft" NASA CR 66685, Jul. 12, 1968.

*Primary Examiner*—Galen Barefoot

[57] ABSTRACT

An airplane construction is described in which the flight characteristics of the airplane, are radically changed from hypersonic capable to short take off and landing (STOL) capable by the approximate ninety degree (90) rotation of a new component of the airplane, referred to as a body spar, which function is to maintain structural integrity of the airplane and maintain the required alignment of such elements as the fixed wings, thrust providers, control surfaces and landing gear, regardless of the mode of flight of the airplane.

The single largest component of the airplane, referred to as the wing/fuselage component, is so shaped as to be a high aspect ratio, highly cambered, (STOL) wing when the airplane is configured for subsonic/STOL flight, that is when this wing/fuselage is positioned at an approximate right angle to the body spar.

With the airplane configured for transonic/hypersonic flight, by the positioning of the body spar parallel the wing/fuselage component, this component becomes aerodynamically and otherwise, an efficient fuselage.

Also described are means of movement, in or out of a wing/fuselage component and body spar, of people and material, either from transporters, ramps or other parts of the airplane, by using hatches located at the junctures of the wing/fuselage with the body spar.

Also described is means for achieving maximum length of a wing/fuselage component in order to increase its span as a STOL wing. This is achieved by the placement of the vertical fin and rudder on the body spar but off the center line of the airplane, and by the placement of two flight control decks within the wing/fuselage component.

3 Claims, 5 Drawing Sheets

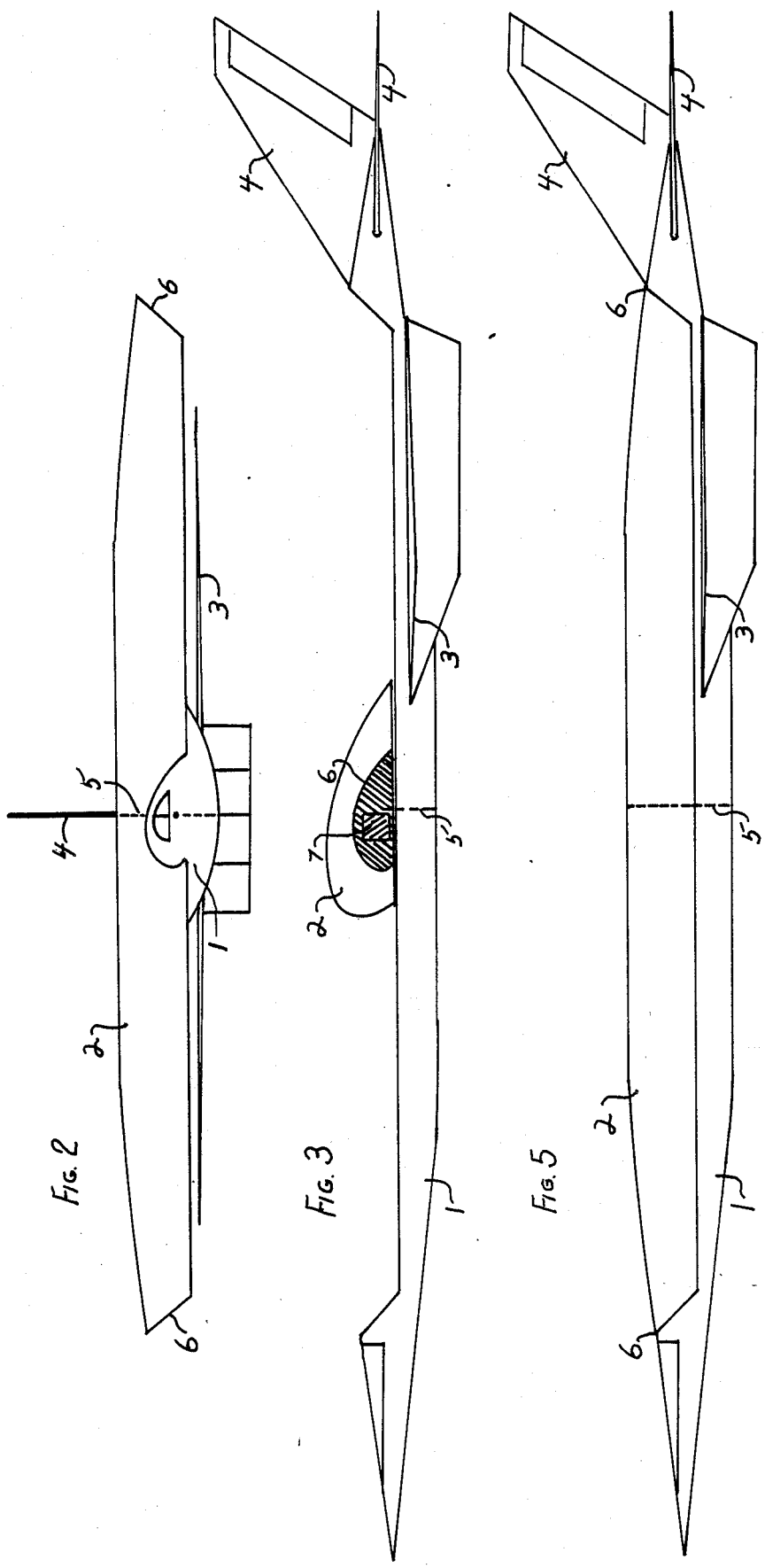

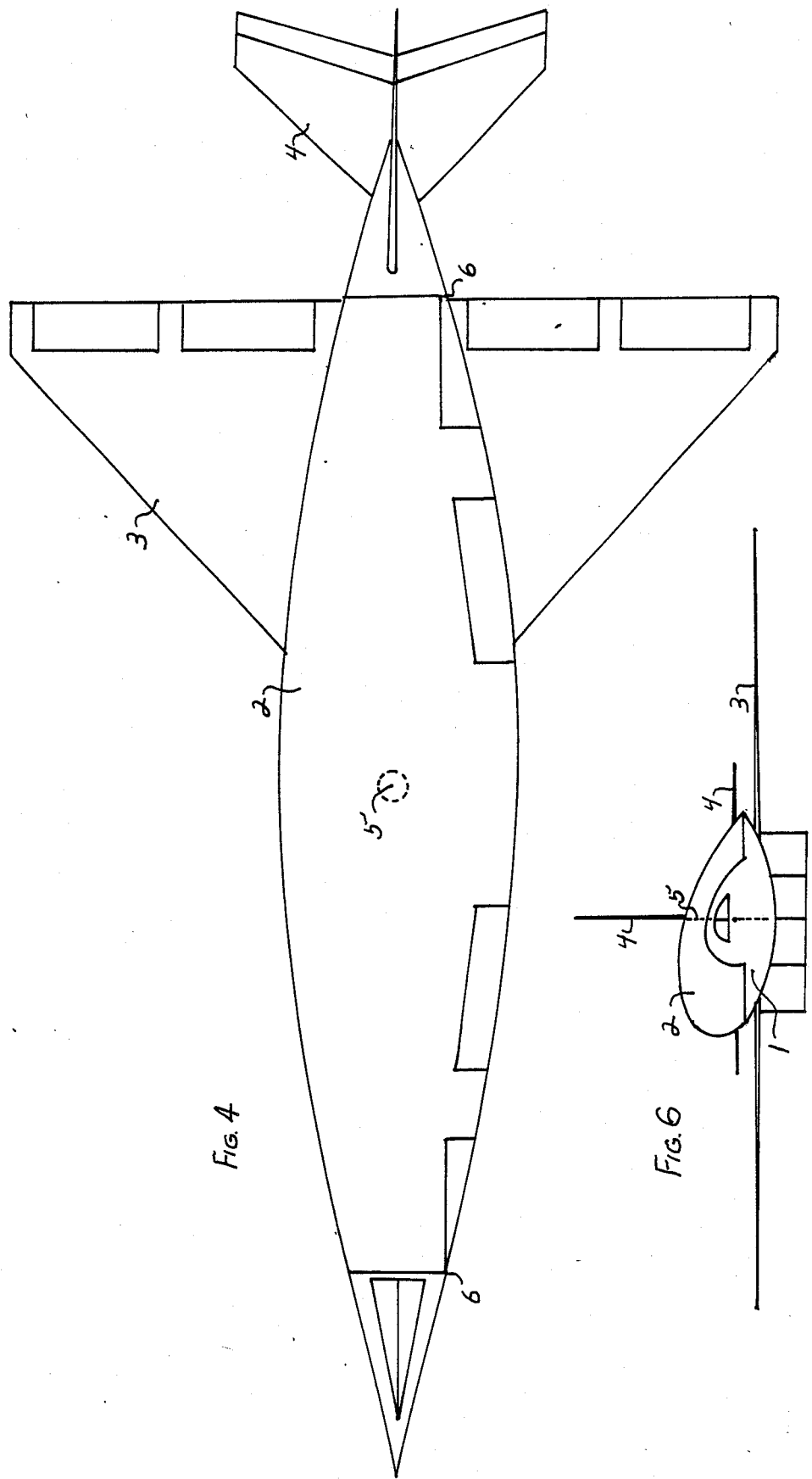

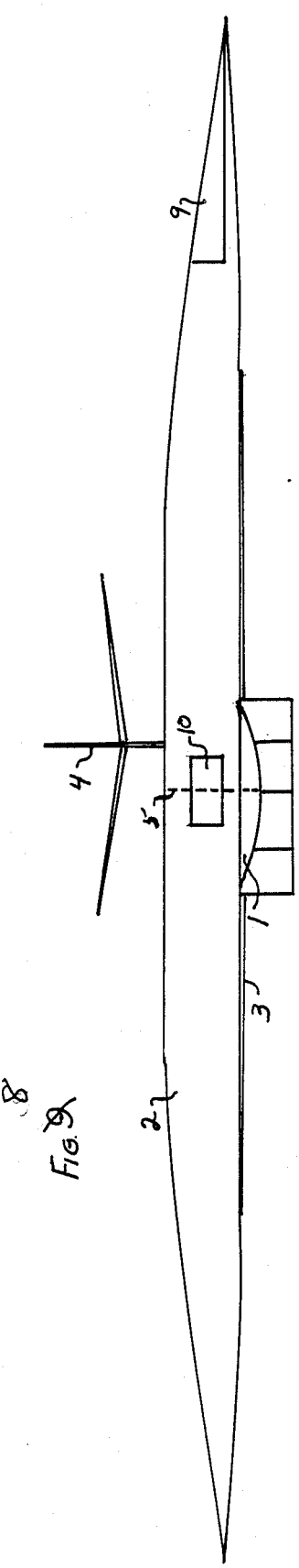
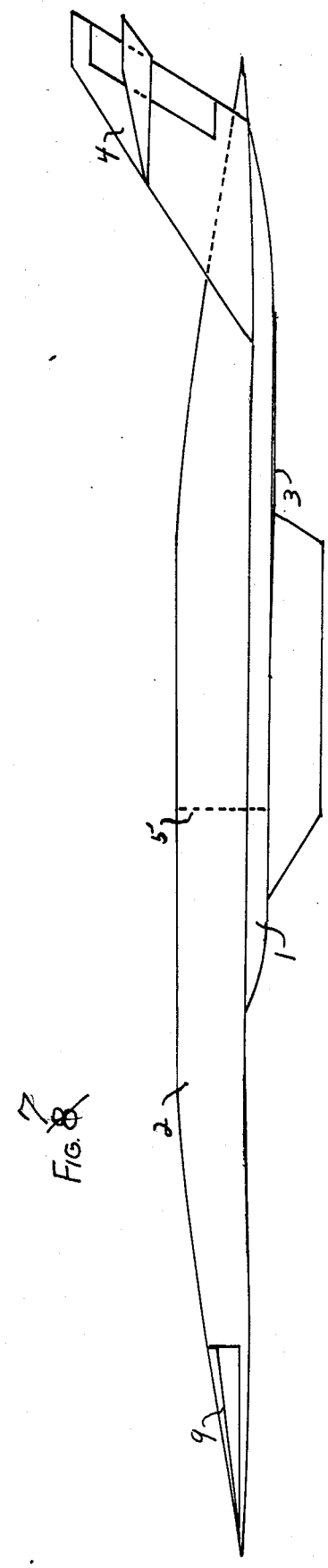

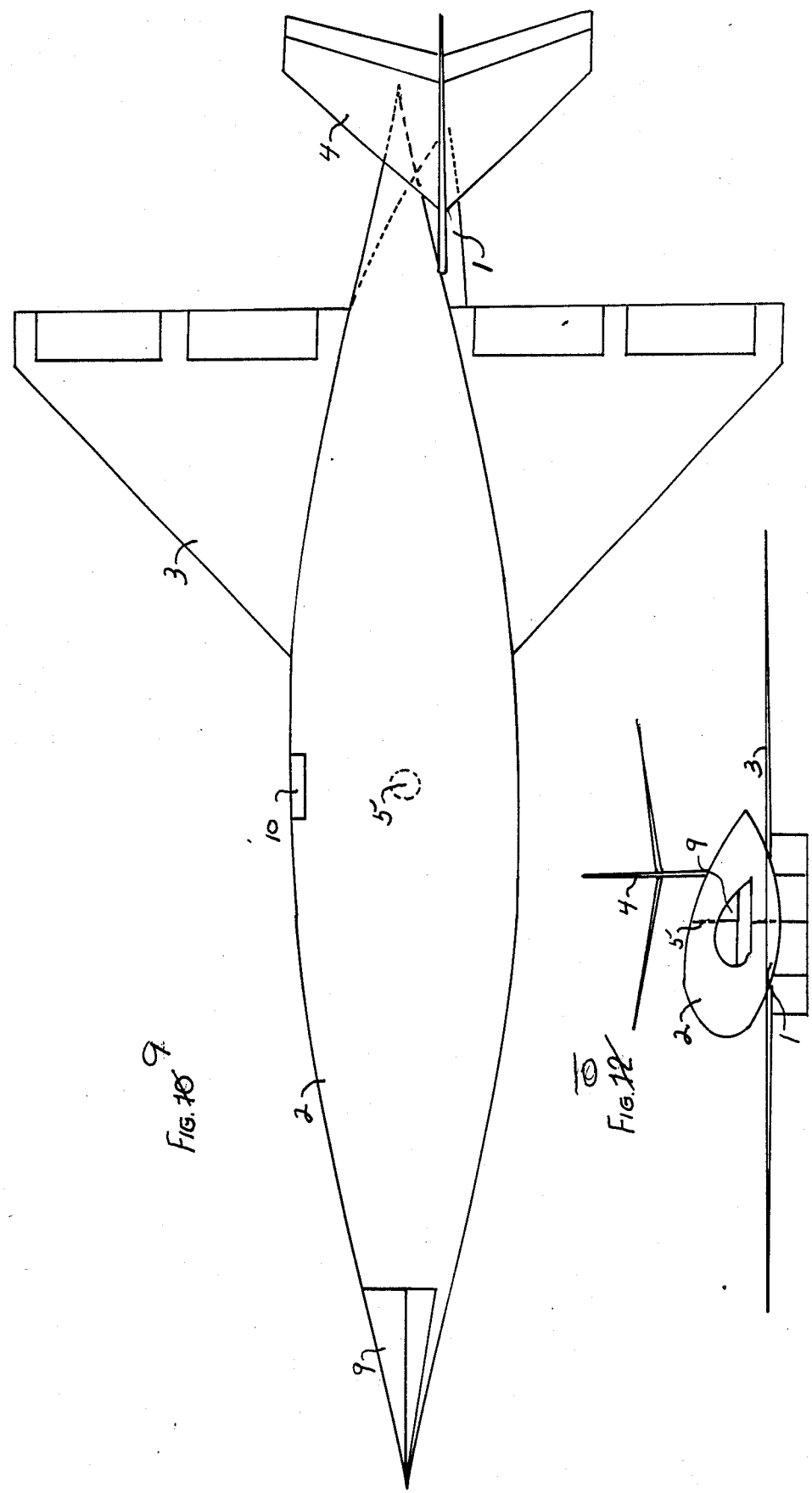

AIRPLANE WITH TRANSONIC/HYPERSONIC TO SHORT TAKE OFF AND LANDING (STOL) FLIGHT CAPABILITY

This application is a continuation-in-part of my earlier application Ser. No. 854,475 filed Apr. 22, 1986 and now abandoned.

SUMMARY OF THE INVENTION

This invention pertains to airplanes in general and particularly to an airplane which, by means of this invention, becomes capable of operation at both transonic to hypersonic, (transonic/hypersonic) speeds and capable of operation at subsonic to short take off and landing, (STOL) speeds during the same flight.

The invention builds on the prior art related to airplanes known as "flying wings" and secondarily on the prior art related to airplanes having rotatable wings.

For well known reasons associated with drag due to lift, it has been heretofore impossible for a conventional "flying wing" to become part of a transonic/hypersonic airplane. This invention eliminates this problem by providing for such a "flying wing" to be the STOL wing of the airplane for take off and landing operation, then to become the fuselage of the airplane when the airplane is configured for transonic/hypersonic speeds. This provision is by means of a newly conceptualized body spar component being rotated around an axis centerward of the wing/fuselage component.

This invention permits an optimum flight speed envelope between the airplane's short take off and landing (STOL) capability and its maximum speed, optimally supersonic/hypersonic, by providing means for achieving a maximum length or span of the wing/fuselage component. This is accomplished by offsetting the tail section flight control surfaces so that the wing/fuselage component, in its fuselage configuration, can extend beyond beyond the tail control surfaces.

The purposes of the invention are achieved, first, by the design of the airplane as a type of "flying wing" by its having its payload internal to the wing. When it is being flown with its longest dimension transverse the airstream the "flying wing" portion of the airplane becomes a STOL wing. This component is so shaped as to be a fuselage, practical and aerodynamically efficient for transonic/hypersonic speeds, when the component is positioned with its longest dimension parallel its line of travel.

This STOL wing to transonic/hypersonic fuselage transition is achieved by the approximate ninety degree (90) rotation, from this wing/fuselage component, of a spar or boom, hereinafter referred to as a body spar. The purpose of this rotatable body spar is to maintain structural integrity and proper alignment between the airplane's wing/fuselage component and the airplane's means of thrust, its yaw/pitch control surfaces, other airfoils and landing gear, since these must be properly aligned with the airplane's direction of flight at all times.

This STOL wing to transonic/hypersonic fuselage transition is further achieved by the rotation of the body spar about an axis at or near the center of the wing/fuselage component. The means of attachment and capability of rotation is according to the conventional manner of attaching and rotating major aerodynamic components of airplanes such as the swinging of the wing about the body of the F111.

In one preferred embodiment of the invention, means are provided for passage of people or material between the wing/fuselage component and the flight deck or tail/control areas of the body spar by the alignment and integration of two hatches, one in each end of the wing/fuselage component, and two corresponding hatches in the body spar.

In their open position the hatches in the wing/fuselage component provide access to the wing/fuselage from airport ramps and/or transporters when the airplane is stopped on the ground and the body spar is rotated to its STOL position. In their closed position these hatches complete the aerodynamic integrity of the tip area of wing/fuselage as a wing, and allow pressurization of the wing/fuselage when the airplane is configured for STOL flight.

In their open positions, the hatches in the body spar provide access to the forward flight deck and rearward control areas, both when the airplane is stopped on the ground in its STOL configuration and when it is in its transonic/hypersonic flight configuration. In their closed positions, these hatches provide protection from the outside elements and allow pressurization of the body spar areas when the airplane is in its STOL configuration.

In another preferred embodiment of the invention, means are provided for achieving an optimum span of the wing/fuselage component for its operation as the STOL wing. This is accomplished by offsetting the attachment of the tail section control surfaces from the centerline of the airplane so that the wing/fuselage component can extend past the control surfaces at the end of the body spar and thus exceed twice the length of the body spar. Thus, this transonic/hypersonic capable airplane, on landing or taking off, could present the appearance of a high efficiency sailplane.

This embodiment of the invention provides means of achieving the largest wing area and thus the lowest wing loading and lowest (STOL; speeds for any transonic/hypersonic speed capable airplane imaginable.

The airplane is provided fixed wings for its transonic/hypersonic flight mode in the conventional manner. The difficulty of a considerable change in the center of lift between the airplane's two flight modes is managed by augmented pitch control and managing the center of gravity by the pumping of fuel aft when going from the STOL to transonic/hypersonic flight mode and forward when going from the transonic/hypersonic to the STOL flight mode.

It is contemplated that the in-flight rotation between the wing/fuselage component and the body spar will occur at speeds near the high end of the airplane's STOL speed envelope and at speeds near the lower end of the transonic/hypersonic speed envelope. This envelope of rotation is thus estimated to be between 200 and 300 knots. While this may require wing tip flutter control during rotation, it is not impractical because of present computer augmented aileron control technology such as on the X 29.

Means for the additional securing of the body spar to the wing/fuselage, when they are stationary in either configuration, are within the current technology associated with swing wing airplanes.

It is an object of this invention to provide an airplane whose minimum to maximum operational speed differential is increased by a factor of not less than two, (2), over any other equivalent airplane, except a vertical take off and landing, (VTOL), airplane. This is to assert that this airplane, with a maximum speed as fast as current thrust and transonic/hypersonic materials and technology will allow, will be able to land at speeds one half or less than one half the speeds of any airplanes of equal load carrying and maximum speed capabilities, not designed in accordance with this invention.

This invention will permit a multitude of individual designs based on it. It will be evident to those skilled in the art that this invention has tremendous implications for both national defense and commerce.

It is a further object of this invention to provide a transonic/hypersonic speed capable airplane, also capable of taking off and landing at almost any improved airstrip in the world. Operation of such an airplane from a carrier deck would also be possible.

It is a further object of this invention to provide a transonic/hypersonic speed capable airplane, fully utilizing the known advantages of STOL for reasons of flight and take off and landing safety, utility and aeronautical efficiency and economy in general.

It is a further object of this invention to provide a transonic/hypersonic speed capable airplane able to fly at a much reduced, if not zero degrees, nose-up attitude in its subsonic flight and STOL configuration.

The invention draws on the background of what is well known, to those skilled in the art, Flying Wings wherein great lift efficiencies are obtained by using the primary load containing structures of airplanes as also their primary aerodynamic lifting structures. It draws on the background, again well known to those skilled in the art, of the considerable aerodynamic advantages of high aspect ratio and highly cambered wings for STOL flight.

A further background of the invention is provided by the various inventions and patents relating to the swinging of airplane wings to present either better planforms to the airstream for the desired mode of flight, or more radically, presenting a different edge of the wing to the airstream, as the leading edge, for the different modes of flight.

For examples, Vogt U.S. Pat. No. 3,155,344 proposes a ninety degree (90) rotation of the wing, making both the leading edge and the trailing edge of the wing for the airplane's slow flight mode, the new leading for the airplane's high speed flight mode. Calvert U.S. Pat. No. 3,606,214, in a preferred embodiment, claims a wing, the (90) degree rotation of which, presents the trailing edge of the wing as the new leading edge, for the airplane's high speed flight mode.

This invention differs from these patents as well as Whitener, Tammeo, Auschwitz, Venel and others. Whitener teaches a highly cambered wing, (with wing tip loading), concept. An earlier Whitener patent and the others cited teach the swinging of components which remain wings, become part of the fuselage, or are stored. None of these prior patents teach a wing/fuselage component concept with a boom or spar swinging to properly align thrust, control, fixed wing and landing gear elements.

BRIEF DESCRIPTION OF THE DRAWINGS

The invention may be best understood by reference to the descriptions of the preferred embodiments shown hereinbelow in conjunction with the drawings in which:

FIG. 2 is a front elevation of the first preferred embodiment of the invention, showing the airplane configured as in FIG. 1.

FIG. 3 is a left side elevation of the first preferred embodiment of the invention, showing the airplane configured as in FIGS. 1 and 2, this elevation showing the shaping of the pay load carrying area as an efficient STOL wing.

FIG. 4 is a top elevation of the first preferred embodiment of the invention, with the airplane now configured for transonic/hypersonic flight according to the principles of this invention, in which the wing/fuselage component, with its longest dimension parallel the airstream, is the fuselage of the airplane.

FIG. 5 is a left side elevation of the first preferred embodiment of the invention, showing the airplane configured as in FIG. 4.

FIG. 6 is a front elevation of the first preferred embodiment of the invention, showing the airplane configured as in FIGS. 4 and 5, this elevation showing the inventively different shaping of the wing/fuselage component to make it an efficient fuselage.

FIG. 7 is a left side elevation of the second preferred embodiment of the invention, showing an airplane, configured for transonic/hypersonic flight according to the principles of the invention, in which the wing/fuselage component, with its longest dimension parallel the airstream, is the fuselage of the airplane.

FIG. 8 is a front elevation of this second preferred embodiment of the invention, showing the airplane configured for STOL flight. This elevation shows an example of an object of the invention to achieve an optimum wing span.

FIG. 9 is a top elevation of this second preferred embodiment of the invention, showing the airplane configured for transonic/hypersonic flight. This elevation best shows the relationship of the wing/fuselage length to the body spar length and the usefulness of offsetting the attachment of the tail section control surfaces from the centerline of the airplane.

FIG. 10 is a front elevation of this second preferred embodiment of the invention, showing the airplane configured as in FIG. 9.

DETAILED DESCRIPTION OF THE INVENTION

Figure 1:
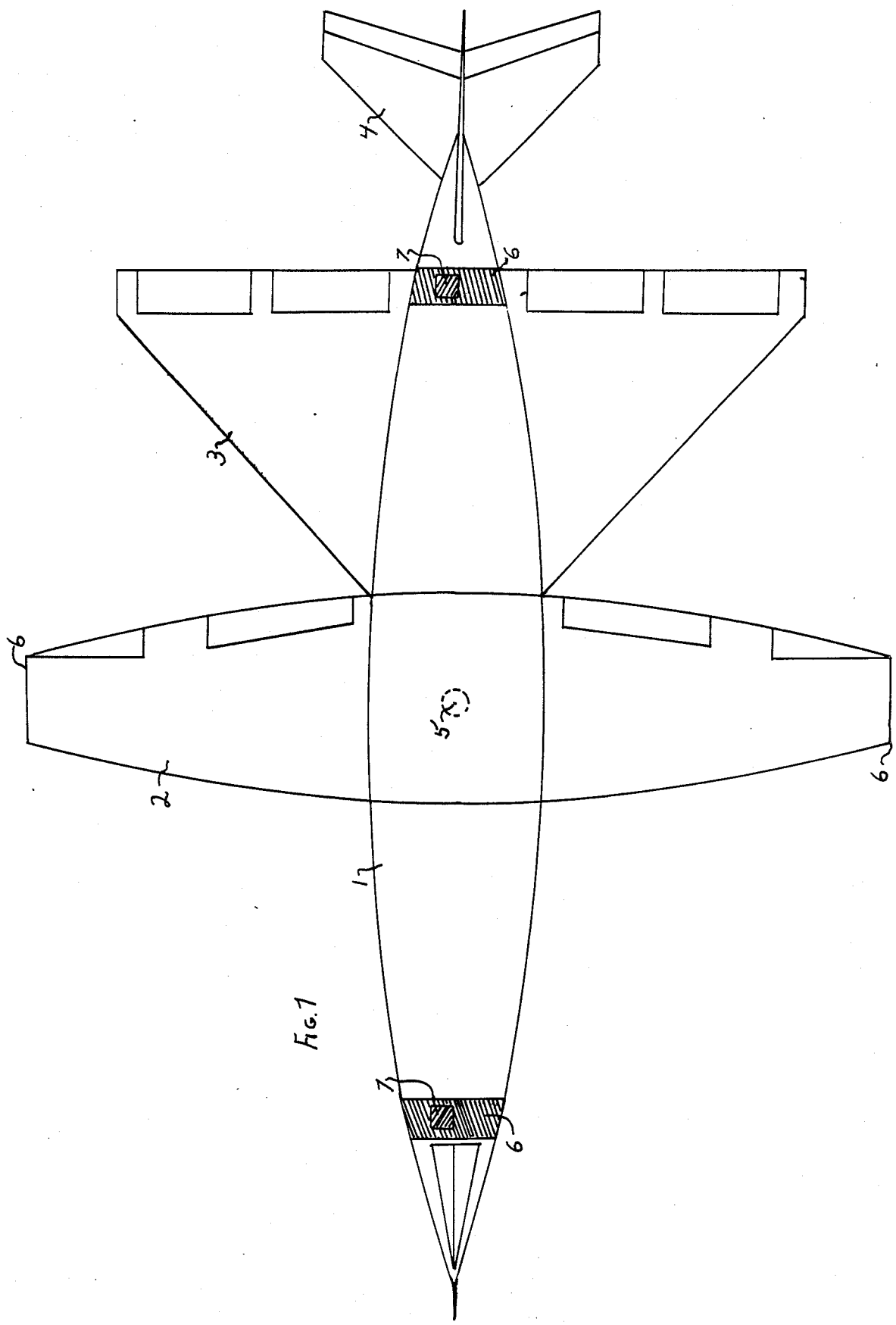
FIG. 1 is a top elevation of the first preferred embodiment of the invention, showing the airplane configured for STOL flight according to the principles of this invention, in which the wing/fuselage component, with its longest dimension transverse the airstream, is the STOL wing.

Illustrated in FIGS. 1 through 6 is the first preferred embodiment of the invention showing an airplane, consisting of a rotatable body spar 1, a wing/fuselage component 2, a fixedly attached wing 3 and tail 4.

Shown by the illustration is the long span and high camber of the wing/fuselage, component and how it is the STOL wing in the airplane's subsonic/STOL flight configuration. Also shown by illustration is how this wing/fuselage component is the fuselage in the airplane's transonic/hypersonic flight configuration. The point of rotation of the body spar around the wing/fuselage component is shown at 5.

Means for the integration, ingress/egress, etc. between the wing/fuselage and body spar components of the airplane during rotation or in either mode is contemplated by this invention, near point 5.

In this first preferred embodiment of the invention, the junctures, of the wing/fuselage component with the flight deck and tail areas of the body spar, are shown at 6.

Located in these two junctures of the wing/fuselage and body spar components are hatches, which when open, provide means of access to these components and when closed, provide for protection from the elements and allow for pressurization of the components. These hatches are conventional type pressurized hatches, except for their being designed to work both separately and in conjunction with each other, depending on the airplane's configuration. These hatches are shown at points 7.

Illustrated in FIGS. 7 through 10 is a second preferred embodiment of the invention having the same components as the first preferred embodiment except the junctures 6 and hatches shown at 7. In this embodiment of the invention the transonic/hypersonic flight control deck 9 is in and becomes a part of the wing/fuselage component 2. A second flight control deck for the airplane's STOL mode of operation is shown at 10.

Also shown in FIGS. 8, and 10 is the attachment of the tail control surfaces 4, on the body spar 1, offset from center line of the airplane, to allow for a maximum span of the wing/fuselage component 2.

What I claim is:

1. An airplane comprising a fuselage having a nose portion a tail portion and an intermediate portion, control surfaces mounted on said tail portion, a fixed wing connected to said fuselage adjacent said tail portion and a second wing pivotally mounted to said intermediate portion, said second wing having an assymmetric airfoil cross-section with a cargo space being located within said second wing, said airplane including means for rotating said second wing from a position where its longitudinal axis is normal to the longitudinal axis of said fuselage, and operates then as a STOL wing, to a position parallel to the fuselage for operation at high speeds, said fuselage being provided with a recess in its upper surfaces to accommodate said second wing in said parallel position in a faired manner with said fuselage, said fuselage is further provided with hatch means at the forward and aft ends of said recess to access corresponding hatch means or said second wing when in its parallel position to permit access of people and material between said fuselage and said second wing.

2. An airplane comprising a fuselage having a nose portion, a tail portion and an intermediate portion, control surfaces mounted on said tail portion, a fixed wing connected to said fuselage adjacent said tail portion and a second wing pivotally mounted to said intermediate portion, said second wing having an assymmetric airfoil cross-section with a cargo space being located within said second wing, said airplane including means for rotating said second wing from a position where its longitudinal axis is normal to the longitudinal axis of said fuselage, and operates then as a STOL wing, to a position parallel to the fuselage for operation at high speeds, said second wing being of a length substantially equal to or greater than said fuselage with said control surfaces being offset to a side of said fuselage to accommodate said second wing in said parallel position, said second wing further including a first and second flight control deck.

3. An airplane as in claim 2 wherein said first flight control deck is located in a tip of said second wing and is for high speed flight when said second wing is in said parallel position and said second flight control deck is located toward the center of said second wing and is for low speed flight when said wing is in its first STOL wing position.

* * * * *